Dec. 8, 1931.  C. A. HAWKINS  1,835,112
MOTOR VEHICLE
Filed Feb. 4, 1926     3 Sheets-Sheet 1
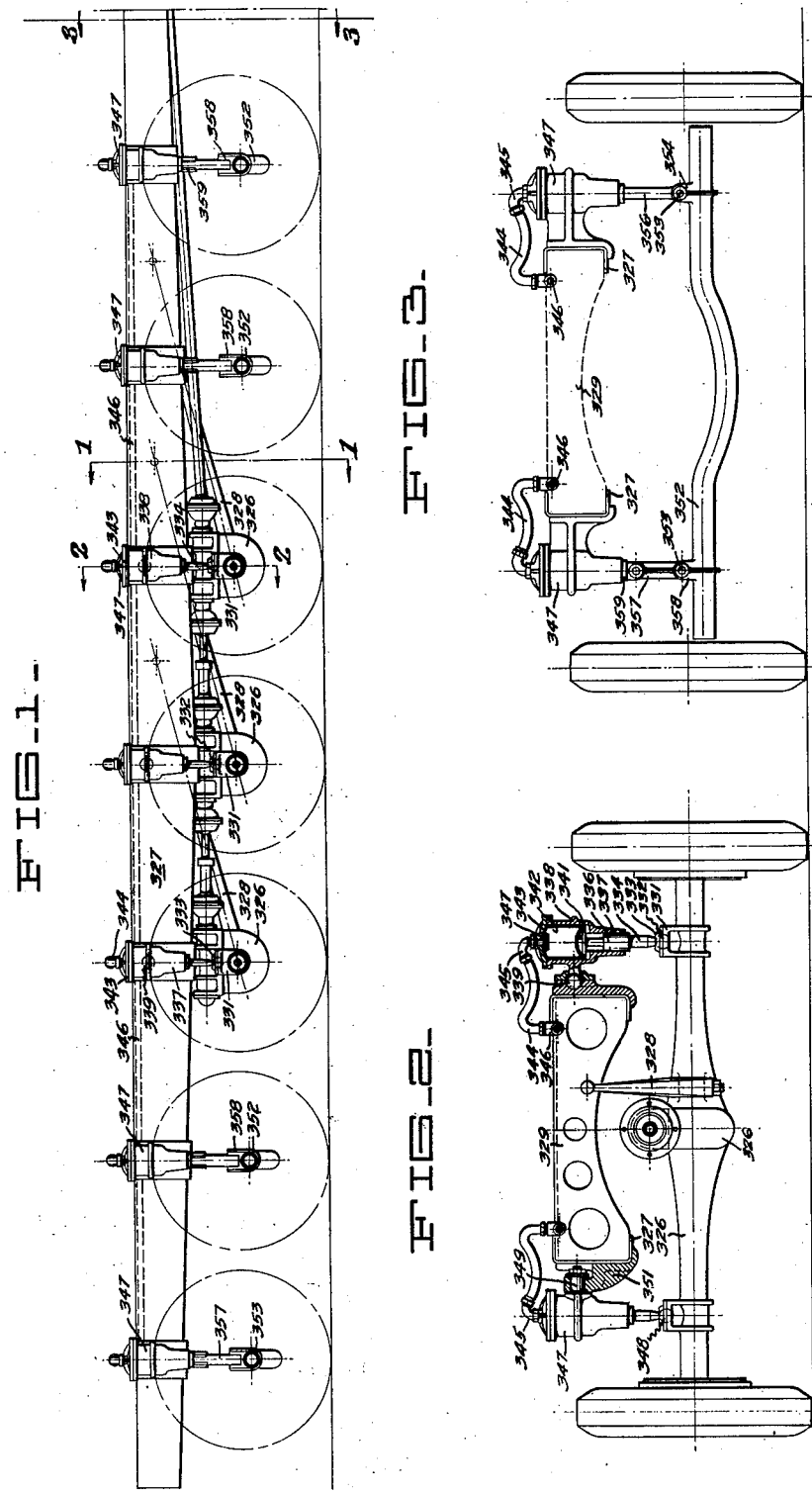

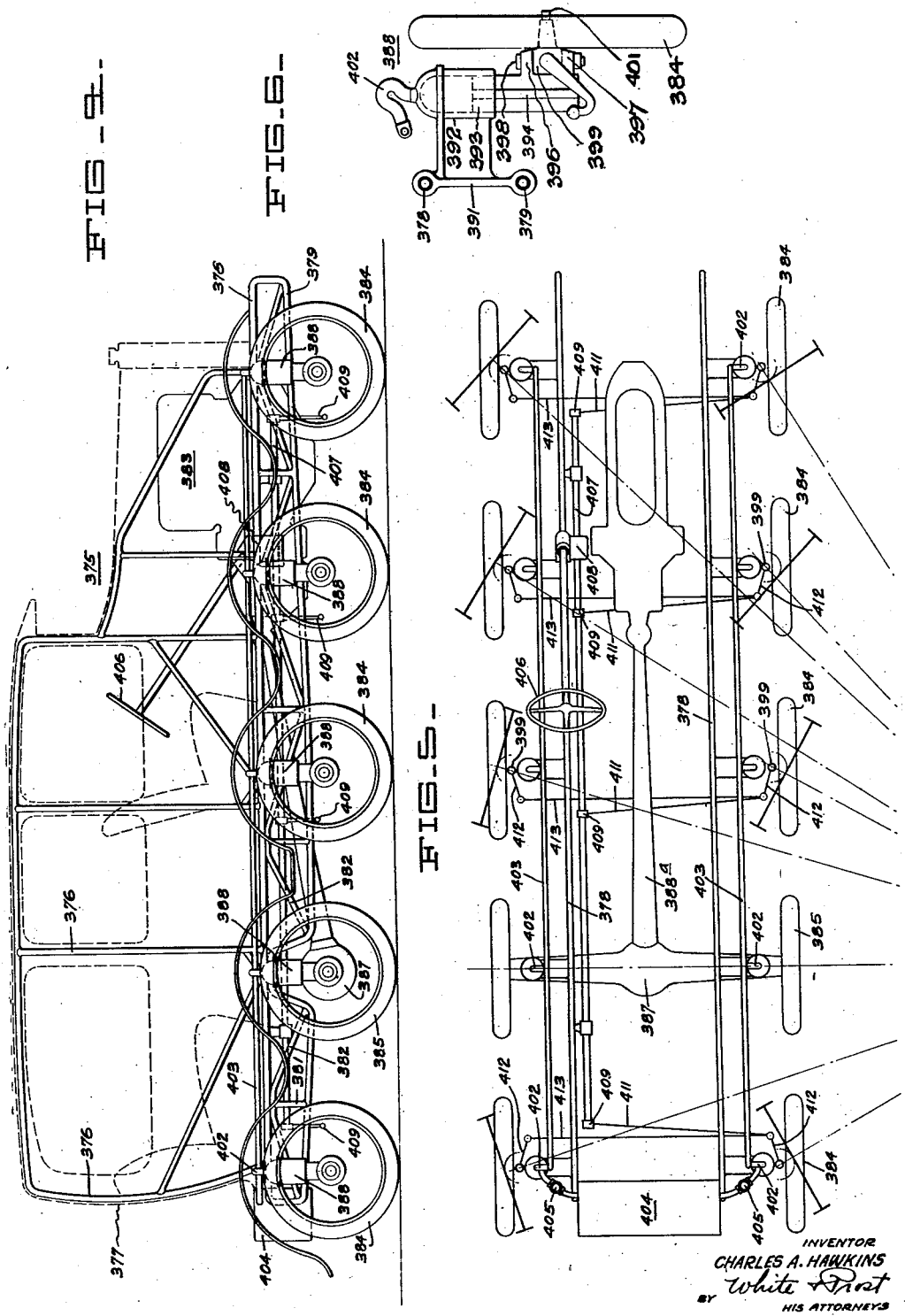

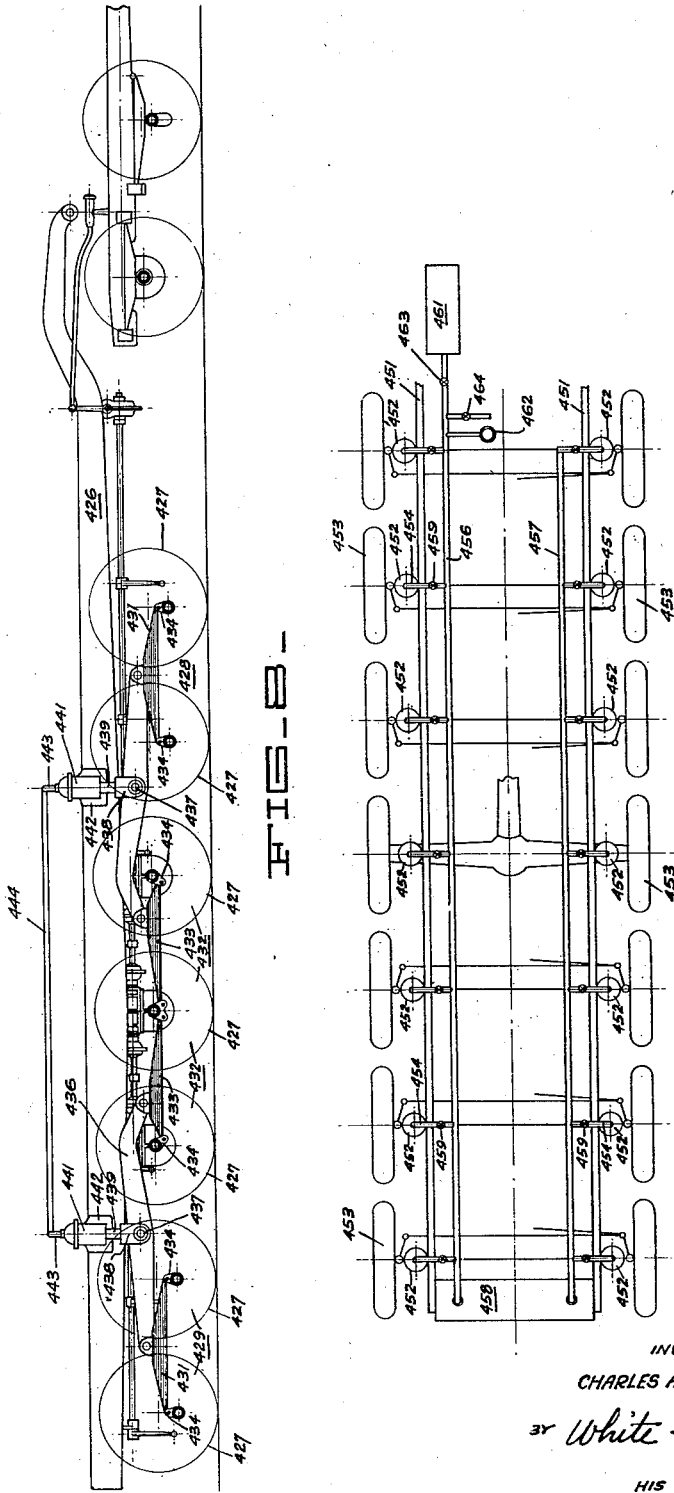

Patented Dec. 8, 1931

1,835,112

UNITED STATES PATENT OFFICE

CHARLES A. HAWKINS, OF SAN FRANCISCO, CALIFORNIA, ASSIGNOR TO HAWKINS' PATENTS, LTD., A CORPORATION OF NEVADA

MOTOR VEHICLE

Application filed February 4, 1926. Serial No. 85,863.

My invention relates to motor vehicles of all kinds including passenger and freight carrying automobiles. It may advantageously be embodied in a truck or motor lorry designed to haul heavy loads at high speed as well as in a light vehicle primarily intended for passenger carrying or pleasure. For convenience in description, I shall first consider the adaptation of my invention to a freight carrying lorry or vehicle for use with heavy loads.

In modern transportation, it is becoming increasingly important to move large and heavy loads at high speed. This is in part made possible by the excellent system of highways available, and in order to make the greatest use of such highways and also to provide high speed transportation where highways are not available, the truck or lorry of my invention is capable of transporting heavy loads at high speed over highways or unimproved roads. The pay load placed on a vehicle is often bulky as well as heavy, and I consequently have designed a vehicle of extra long wheel base so that a large body may be mounted thereon, and in order to reduce the unit load on the roadway I preferably provide a large number of load carrying wheels. This enables me to place but a small proportion of the total load on each wheel, and by so reducing the load on the individual wheels, I may advantageously use pneumatic tires which reduce the road shocks on the vehicle and permit of high speed without damage to the roadway.

In this vehicle, means are preferably provided for distributing approximately equal amounts of the weight of the pay load to each of the wheels in order to equalize the wear on the roadway and on the vehicle.

An object of the invention is to provide a multi-wheel vehicle preferably having at least three pairs of proximately located wheels, which can be of a relatively light, easily maneuvered type.

Another object of the invention is to provide a multi-wheel vehicle in which the load distribution to the wheels is such that a simple, light steering mechanism can be employed.

A further object of the invention is to provide a multi-wheel vehicle in which the load is distributed equally or as desired to each of the wheels.

The invention possesses other advantageous features, some of which, with the foregoing, will be set forth at length in the following description where I shall outline in full that form of the vehicle of my invention which I have selected for illustration in the drawings accompanying and forming part of the present specification. In said drawings, I have shown one form of vehicle embodying my invention, but it is to be understood that I do not limit myself to such form since the invention as set forth in the claims may be embodied in a plurality of forms.

In the drawings:

Fig. 1 is a side elevation of my vehicle showing a pneumatic suspension system.

Fig. 2 is a cross section of the rear truck on the line 1—1 of Fig. 1, portions of a pneumatic cylinder and two hangers being shown in cross section on the line 2—2 of Fig. 1.

Fig. 3 is a cross section of the rear truck on the line 3—3 of Fig. 1, showing a non-driving axle with pneumatic cylinders in elevation.

Fig. 4 is a side elevation of a modified form of vehicle using the pneumatic suspension system showing particularly the tubular skeleton or framework.

Fig. 5 is a plan view of the vehicle shown in Fig. 4, portions of the vehicle, especially the steering arrangements being shown diagrammatically.

Fig. 6 is a detail showing a pneumatic cylinder and associated parts in side elevation.

Fig. 7 is a side elevation of a vehicle, portions being omitted, showing a modified form of pneumatic suspension system.

Fig. 8 is a plan view of a portion of the vehicle of Figure 7 showing a selective interconnecting system for the cylinders of the pneumatic suspension system.

My invention preferably comprises a multi-wheeled vehicle, usually having six or more proximately located wheels, in which the load is distributed in a predetermined manner to the wheels, and in which a steering mechanism is provided for the wheels and is designed to take advantage of the manner of load distribution.

In one modification of my invention, I preferably provide a vehicle which is made in two portions or trucks pivoted together for relative rotational movement in a horizontal plane. In the front truck of such an articulated vehicle, the power plant and driver's compartment are usually located. The rear truck is ordinarily confined to the carrying of the pay load. The number of wheels on each portion is variable, but in most instances four wheels are used on the front one of the two trucks while preferably six or more proximately located wheels are used on the rear truck. The articulated vehicle is highly advantageous when a long wheel base is employed. In the articulated vehicle, the relative pivotal movement between the front and rear portions or trucks is utilized to effect the proper steering movement of the dirigible wheels of the rear truck. This type of vehicle is shown in Figure 22.

In multi-wheeled vehicles of the type described, the advantages of the large number of wheels are lost, or at best greatly reduced, if inequalities and irregularities in the road surface cause the load to be concentrated, more or less intermittently, on but two or three of the wheels. Each wheel and its associated parts must then be constructed sufficiently strong to bear at any time an excessive proportion of the total load. Such extra weight and complication largely negative the desirability of multi-wheels. This is particularly true in connection with the steering mechanism. In the past, numerous attempts to produce a multi-wheeled vehicle have been failures because a suitable combination of steering mechanism and load distribution to the wheels was not effected. My invention encompasses a vehicle, articulated or not, in which the load distribution to the wheels and the manner of steering are such that all of the advantages of multi-wheeled construction are realized.

A preferred means for effecting distribution of the load on the wheels of a vehicle, especially the wheels of a rear truck of an articulated vehicle of the type shown in Figs. 7 and 8, is illustrated in Figs. 1 to 3. This means employs expensible chambers containing fluid to connect the main frame to the axles. In the preferred form of this suspension system the fluid employed may advantageously be air.

Each of the driving axles 326, which are spaced from the main frame 327 by torque arms 328 rigidly affixed to the axles and universally connected to cross members 329, is provided adjacent one end with a hemispherical saddle 331 in which a ball 332 is seated and retained for universal movement by an apertured hemispherical cap 333. An upright stem 334 is attached to the ball 332 and extends thru the aperture in the cap. The stem is enlarged intermediate its ends to form a piston 336 which is free to slide in a cylinder 337 depending from a housing 338 affixed to the main frame 327 by a ball and socket joint 339. The upper end of the stem 334 is enlarged into a mushroom or circular convex disc 341 which bears against a bag 342 of rubber or other suitable material retained in the housing 338 by an apertured cap 343. The bag 342 is connected by an elbow 345 and a flexible hose 344 to a pipe 346 which serves as a main interconnecting the hoses of all the pneumatic cylinders, denoted generally by the number 347, which are disposed along one side of the vehicle. All of the pneumatic cylinders are exactly similar but the means by which they are attached to the main frame and to the axles differ slightly. One side of each driving axle 326 is provided with a cylinder 347 mounted between two ball and socket joints, as described, while the other side of the axle is provided with a similar cylinder 347 connected to the axle by a ball and socket joint 348 and to the main frame 327 by a pin 349 journalled in a bracket 351 attached to the frame. This manner of connecting the driving axles to the main frame permits full up and down movement of the axles at the same time taking the torque and driving strains thru the torque arm 328, and permits transverse vertical oscillation of the axles but prevents sidewise movement with respect to the main frame.

The non-driving axles 352 are also provided with pneumatic cylinders 347 adjacent each end. These cylinders are rigidly attached to the main frame 327 and one of them is pivoted to the axle 352 by means of a pin 353 which passes thru a forked seat 354 on the axle and thru an alined aperture in the rod 356 which is otherwise similar to the rod 334. The other pneumatic cylinder is attached to the axle 352 by a shackle of the usual kind which comprises a link 357 pivoted at one end to a forked seat 358 on the axle and pivoted at the opposite end to the rod 359 in other respects like rod 334. By connecting the main frame to the non-driving axles in this fashion the axles may rise and fall freely and may oscillate transversely in a vertical plane but are restrained from shifting forward or aft or transversely.

It will be apparent that since all the pneumatic cylinders on one side of the vehicle are inter-connected, an equal load will be borne by each wheel and that if one wheel of the truck rises due to an uneven place in the roadway, the consequent compression of fluid in the associated cylinder will increase the pressure thruout the interconnected cylinders and will tend to raise the main frame equally thruout its length. The reverse effect is caused if one wheel or a number of wheels fall. It is contemplated that uneven loads may be placed on the individual wheels by varying the size of their associated cylinders or separating them from the other cylinders and introducing a higher or lower pressure therein. The cylinders on both sides of the vehicle, here described as preferably separate, may be placed in communication if it is desired to do so, and they may also be provided with suitable fluid storage reservoirs if it is deemed expedient.

The pneumatic suspension system may be used in slightly changed form on a modified type of vehicle such as is shown in Figs. 4 and 5. This vehicle is not articulated and is especially intended for the comparatively light loads which are usually encountered in passenger carrying service. The framework or skeleton of the vehicle is preferably made as light as is consistent with ample strength and utmost safety of the passengers and in order to obtain a light load on each wheel and easy riding, that is, very slight body movement due to road inequalities, a plurality of wheels are utilized preferably at least six proximately located wheels. The load on each wheel being small and each wheel carrying an equal portion of the total load, I am enabled to employ very light wheels, such as motorcycle or bicycle wheels.

The framework of the light vehicle, denoted generally by the number 375, is preferably composed of cylindrical tubes 376 suitably united at the proper places, as by welding, to form substantially a unitary framework. The tubes in the upper portion of the framework are shaped and located to provide a light but strong support for a body of any desired kind indicated by the dotted lines 377. Each side of the lower portion of the framework may expediently comprise two parallel tubes 378 and 379 disposed horizontally and suitably interconnected by tubular spacers 381 and braces 382, all welded or otherwise fastened into a unitary structure in which the power plant 383 may be supported.

The framework 375 carrying the body and power plant is supported by a plurality of light wheels 384 and 385 of which the pair of wheels 385 are driving wheels and are connected together by the usual driving axle 387 which receives driving power from the power plant 383 thru a driving shaft 388ª. The axle 387 is joined to the tubes 378 and 379 by pneumatic cylinders 388 in much the same fashion as is shown in Fig. 2. The wheels 384 are preferably made dirigible to effect easy maneuverability of the vehicle, especially in heavy traffic, and are not connected in pairs by an axle but are separately connected to the framework 375 by means of the individual pneumatic cylinders 388. These cylinders, as well as the means for making the wheels 384 easily dirigible are best shown in Fig. 6.

The side tubes 378 and 379 support a bracket 391 which is formed integrally with a cylindrical casing 392. A plunger piston 393 is closely fitted to slide in the casing 392 and is provided with a feather or key 394 which slidably engages a cooperating keyway in the casing. The piston 393 is free to reciprocate in the casing 392 but is prevented from rotating therein. A pair of lugs 396 and 397 are formed on one side of the piston 393 and are apertured in vertical alinement to receive a pin 398 which forms a steering pivot. A steering knuckle 399 is mounted to pivot about the pin 398 and carries a horizontal spindle 401 upon which the wheel 384 is rotatably fastened.

It will be understood that relative vertical motion between the wheel 384 and the framework 375 will cause the piston 393 to vary the volume of the casing 392. This produces an expansion or compression of the fluid, preferably air, which is in the casing and in order to obtain the desired cushioning effect and at the same time maintain a substantially equal distribution of weight to all of the wheels, I preferably interconnect all of the pneumatic cylinders 388 on one side of the vehicle, and also interconnect all of the pneumatic cylinders on the other side of the vehicle. This may be accomplished by providing each casing 392 with a hose 402 which communicates with a pipe 403 forming a main or conduit joining all of the hoses 402.

In that manner vertical movement of a wheel 384 or 385 due to a road inequality will compress or expand the air in all the pneumatic cylinders 389 on that side of the vehicle and a corresponding movement will be imparted to the framework 375 thruout its length.

The fluid pressure in each of the mains or pipes 403, and consequently in the cylinders on each side of the vehicle may be maintained or replenished by a tank 404 supplied by a suitable pump (not shown), and connected to the pipes 403 by leads each of which is provided with a valve 405. The pipes 403, although not normally in communication with each other or the tank 404, may readily be connected to each other for equalization of pressure or for replenishing or diminishing the supply of air by proper manipulation of the valves 405.

The steering of the dirigible wheels 384 is preferably accomplished manually. The steering control wheel 406, located convenient to the driver of the vehicle, actuates a longitudinal steering shaft 407, suitably mounted for rotation with respect to the framework 375, by means of reduction gears (not shown) enclosed in a housing 408. The steering shaft 407 carries depending arms 409 disposed at intervals along its length and which are longer as their distance from the non-dirigible driving wheels 385 increases. It will be apparent that although the angular rotation of all of the arms 409 is the same for a given rotation of the steering control wheel 406, the ends of the arms, being at different lengths from the steering shaft 407, move thru different distances. It is necessary to move the dirigible wheels 384 thru greater steering angles as their distances from the non-dirigible wheels 385 increase and this is accomplished by connecting the more distant wheels to the longer of the arms 409 and the nearer wheels to the shorter of the arms 409. Drag links 411 are connected by a ball and socket joint at one end to the depending arms 409 and by a like ball and socket joint at the other end to arms 412 seated in the steering knuckles 399. Each pair of dirigible wheels is joined for unitary steering motion by a tie rod 413. As may be noted from Fig. 5, the dirigible wheels to the rear of the non-dirigible driving wheels must turn thru their steering angles in a direction opposite to that of the dirigible wheels forward of the driving wheels. This is accomplished by disposing the tie rods 413 of the forward wheels to the rear of their steering pivots and the tie rod of the rear wheels forward of their steering pivots.

It will be appreciated that in this form of my invention I have provided a light vehicle which may be cheaply but strongly constructed, and one in which there will be an equal load distribution on the plurality of light wheels, thereby insuring a comfortable automobile which can be easily maneuvered due to the combination of steering mechanism and suspension means employed.

In Fig. 7 is illustrated a form of rear truck of an articulated vehicle in which the pneumatic suspension system is combined with a leaf spring arrangement. In this combined suspension system, the main frame 426 is supported on a plurality of wheels 427 which are joined in a front group 428 and a rear group 429 by means of springs 431, and in a central group 432 by springs 433. All of the springs 431 and 433 are suitably shackled to axles 434 joining the wheels 427 in pairs. At each side of the main frame 426 are disposed equalizing beams 436 pivoted at one end to a spring 431 of the front or rear group and pivoted at the other end to a spring 433 of the central group. Each equalizing beam 436 is apertured adjacent its mid-portion to receive a pin 437 by means of which it is pivoted to the forked lower end 438 of a piston rod 439 which actuates the piston of a pneumatic cylinder 441 similar to the pneumatic cylinders shown in Fig. 2 or in Fig. 6. The pneumatic cylinders 441 are suitably attached to each side of the main frame by substantial brackets 442. Each cylinder 441 is provided with an air pipe or pneumatic passage 443 and the passages of all the cylinders on one side of the frame are preferably interconnected by means of a main or conduit 444, and the passages of the cylinders on the other side of the frame are similarly interconnected.

It will be apparent that loads placed on the main frame 426 will be distributed to the supporting wheels 427 evenly or in any proportion desired partially depending upon the location of the pivotal points of the equalizing beams 436. At the same time, relative vertical movement between the wheels and the frame is modified by the springs, equalizing beams and pneumatic cylinders to produce a slight but uniform vertical movement of the main frame with respect to the ground over which the vehicle is passing.

The steering of this form of vehicle is accomplished as set forth in my above mentioned co-pending application. Turning movement of the front truck relative to the rear truck is transmitted to a longitudinal steering shaft similar to shaft 407 of Figs. 4 and 5. This shaft is provided with depending arms of different lengths which are connected to the individual wheels by mechanism of the usual kind as disclosed in those figures.

In Fig. 8, is shown a pneumatic suspension system applicable to the truck of Fig. 7 to replace the combined system and which is similar in most features to the one illustrated in Figs. 1, 2 and 3.

Each side of the main frame 451 is provided with a plurality of pneumatic cylinders 452 which are suitably connected to the vehicle wheels 453 so that motion of the wheels due to the road inequalities correspondingly varies the volume of the associated cylinders. Each cylinder 452 is provided with a passage 454 thru which air may flow into a common conduit 456 joining all the cylinders on one side of the main frame, or into a common conduit 457 joining all the cylinders on the other side of the main frame. Both conduit 456 and conduit 457 are in communication with an air storage tank or pneumatic reservoir 458 which may be supplied by a suitably driven pump 461. In that manner all of the cylinders are subjected to the same pneumatic pressure and, unless the cylinders are varied in size, all of the wheels will also be subjected to the same total pressure.

In order to place different pressures on the different wheels and also to be able to render the pneumatic cylinders responsive in greater or less degrees to wheel movements due to road inequalities, I preferably provide each passage 454 with a variable constriction or valve 459 which may conveniently be manually regulated. The cylinders may be placed out of communication with each other and with the reservoir 458 simply by closing the valves 459, and in that case the air they contain will act simply as a cushion, expanding and being compressed solely within the individual cylinders. In that instance, the cylinders may be placed under different air pressures thereby causing some of the wheels to carry greater loads than others. This expedient may be resorted to when it is desired to increase the load on the driving wheels to increase their traction.

If the various valves are opened different amounts, the flow of air back and forth thru the passages they control will be more or less restricted and the response of their associated cylinders will be correspondingly slow or rapid. It will be appreciated that by variously manipulating the valves 459 I may replenish the air in the cylinders, may alter the responsiveness of the cylinders, and may vary the load distribution to the numerous wheels.

It is apparent that the pressure in the entire pneumatic system varies with the load placed on the vehicle, that is, as the load becomes heavier, the pressure correspondingly increases and as the load becomes lighter, the pressure automatically and correspondingly decreases. The volume of the system, and that includes especially the volume of the cylinders, varies inversely with the pressure. For that reason, at extremely heavy loads and at extremely light loads the pistons will be working very close to the ends of their stroke in the cylinders and may therefore be somewhat hampered in their movements. The possibility of that difficulty is overcome by providing means for increasing the volume of air in the system as the load increases and correspondingly decreasing the volume of air in the system as the load decreases.

In order to make these means fully effective, all of the valves 459 are opened to their fullest extent so that the pressure thruout the entire pneumatic system is the same. In that case, any change in the load on the vehicle will produce a corresponding change in the pressure of the system, as well as an inverse change of its volume. A pressure gage 462 may be conveniently connected to pipe 456 to indicate to the operator of the vehicle the exact amount of change in the load, and when such change becomes appreciable it may be compensated for by varying the volume of air in the pneumatic system.

The variation in air volume may be effected by properly manipulating either a valve 463 between the pump 461 and the pipe 456 leading to the reservoir 458, or a valve 464 which when open places the pipe 456 and consequently the entire system in communication with the atmosphere. When the load on the vehicle is increased, the valve 464, if not already so, is tightly closed, and the valve 463 is opened until the pump has forced the proper amount of air into the system, as indicated by the pressure gage 462 and the pneumatic pistons which normally should be about midway of the stroke. The valve 463 is then closed. The reverse process is employed in reducing the pressure. That is, the valve 463 is kept closed while the valve 464 is opened sufficiently to allow the escape to the atmosphere of the desired amount of air. During the operation of the vehicle under conditions of steady load, both valve 463 and valve 464 will be kept closed except at rare intervals when valve 463 may be opened momentarily to compensate for whatever slight amount of air that has leaked from the system. Any of the ordinary types of pneumatic pressure regulators may be installed in the proper part of the system to maintain the pressure at any desired value, or to prevent an excess pressure being developed.

In conclusion, it will be seen that a vehicle which embodies my invention can carry loads at high speed, due to the low unit load on each of the multiplicity of wheels, can be turned in a very small circle with a minimum of effort, and due to the flexible mounting of the wheels, can accommodate itself to variations in the road surface with the greatest of ease, at the same time disturbing the position of the vehicle body as little as possible.

I claim:

1. In a motor vehicle, a main frame, three or more first wheels arranged in file along one side of said frame, three or more second wheels arranged in file along the other side of said frame, a first expansible pneumatic device interposed between each of said first wheels and said frame, a second expansible pneumatic device interposed between each of said second wheels and said frame, means for effecting a pneumatic interconnection between all of said first pneumatic devices only and means for effecting a pneumatic interconnection between all of said second pneumatic devices only.

2. In a motor vehicle, a main frame, three or more first wheels arranged in file along one side of said frame, three or more second wheels arranged in file along the other side of said frame, a first group of cylinders mounted on one side of said frame, a second group of cylinders mounted on the other side of said frame, a first group of plungers connected to said first wheels and co-operating with said first cylinders whereby movement of said first wheels with respect to said frame will vary the volume of said first cylinders, a second group of plungers connected to said second wheels and co-operating with said second cylinders whereby movement of said second wheels with respect to said frame will vary the volume of said second cylinders, means for effecting a fluid interconnection between said first cylinders only, and means for effecting a fluid interconnection between said second cylinders only.

3. In a motor vehicle, a main frame, three or more wheels arranged in file along one side of said frame, three or more wheels arranged in file along the other side of said frame, interconnected pneumatic devices for supporting one side of said frame on said first-named wheels, and means isolated from said pneumatic devices for supporting the other side of said frame on said second-named wheels.

4. In a motor vehicle, a normally horizontal main frame; three or more wheels arranged in file along one side of said frame; three or more wheels arranged in file along the other side of said frame; and means for distributing a load on said frame substantially evenly over said wheels on each side of said frame and for automatically restoring said frame to normal, horizontal position after said frame has tipped from said normal position, said means including interconnected pneumatic devices for supporting one side of said frame on said first-named wheels, and interconnected pneumatic devices for supporting the other side of said frame on said second-named wheels, said second-named pneumatic devices and said first-named pneumatic devices being isolated from each other.

In testimony whereof, I have hereunto set my hand.

CHARLES A. HAWKINS.